(12) United States Patent
Lee et al.

(10) Patent No.: US 10,901,135 B2
(45) Date of Patent: Jan. 26, 2021

(54) DISPLAY DEVICE AND METHOD OF MANUFACTURING THE SAME

(71) Applicant: SAMSUNG DISPLAY CO., LTD., Yongin-si (KR)

(72) Inventors: Sanggil Lee, Seoul (KR); Eunguk Lee, Seoul (KR); Byunggon Kum, Suwon-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 16/238,402

(22) Filed: Jan. 2, 2019

(65) Prior Publication Data

US 2019/0204498 A1 Jul. 4, 2019

(30) Foreign Application Priority Data

Jan. 3, 2018 (KR) .................. 10-2018-0000612

(51) Int. Cl.
| | |
|---|---|
| *F21V 8/00* | (2006.01) |
| *G02F 1/1335* | (2006.01) |
| *G02F 1/1339* | (2006.01) |
| *G02B 6/00* | (2006.01) |
| *H04M 1/03* | (2006.01) |

(Continued)

(52) U.S. Cl.
CPC ............ *G02B 6/0051* (2013.01); *G02B 6/00* (2013.01); *G02B 6/0055* (2013.01); *G02B 6/0056* (2013.01); *G02B 6/0065* (2013.01); *G02B 6/0088* (2013.01); *G02F 1/1339* (2013.01); *G02F 1/133308* (2013.01); *G02F 1/133512* (2013.01); *G02F 1/133514* (2013.01); *H04M 1/03* (2013.01); *G02B 6/0053* (2013.01); *G02F 1/133615* (2013.01); *G02F 2001/13398* (2013.01); *G02F 2001/133317* (2013.01);

(Continued)

(58) Field of Classification Search
None
See application file for complete search history.

(56) References Cited

U.S. PATENT DOCUMENTS

| | | | |
|---|---|---|---|
| 7,755,269 B2 | 7/2010 | Sawai et al. | |
| 2010/0283072 A1* | 11/2010 | Kazlas ................ | G02B 6/005 257/98 |

(Continued)

FOREIGN PATENT DOCUMENTS

| | | |
|---|---|---|
| JP | 2007-227230 | 9/2007 |
| KR | 10-1071885 | 10/2011 |

(Continued)

*Primary Examiner* — Ryan Crockett
(74) *Attorney, Agent, or Firm* — H.C. Park & Associates, PLC

(57) ABSTRACT

Disclosed herein are a display device and a method of manufacturing the same. The display device includes: a display panel including a first substrate, a second substrate disposed opposite to the first substrate, and a liquid crystal layer disposed between the first substrate and the second substrate; a light guide plate configured to receive light from light sources disposed on a side surface thereof, and to emit the light to the display panel; an optical sheet disposed between the light guide plate and the first substrate; and a spacer disposed and attached between the display panel and the light guide plate. The spacer has a uniform width along a thickness direction.

14 Claims, 8 Drawing Sheets

(51) Int. Cl.
    *G02F 1/1333* (2006.01)
    *G02F 1/13357* (2006.01)
(52) U.S. Cl.
    CPC ............ *G02F 2001/133614* (2013.01); *G02F 2202/28* (2013.01); *G02F 2202/36* (2013.01)

(56) References Cited

U.S. PATENT DOCUMENTS

| | | | | |
|---|---|---|---|---|
| 2011/0242845 | A1* | 10/2011 | Hong | G02B 6/0025 |
| | | | | 362/608 |
| 2014/0204275 | A1* | 7/2014 | Shimizu | G02F 1/133611 |
| | | | | 348/725 |
| 2016/0195673 | A1* | 7/2016 | Yoon | G02B 6/005 |
| | | | | 362/606 |
| 2016/0259121 | A1* | 9/2016 | Yonezawa | G02F 1/1333 |
| 2016/0266305 | A1* | 9/2016 | Yonezawa | G02F 1/1333 |
| 2016/0299285 | A1* | 10/2016 | Lee | G02B 6/0088 |
| 2017/0139100 | A1 | 5/2017 | Nam et al. | |
| 2017/0205569 | A1* | 7/2017 | Sugimoto | G02B 6/0088 |
| 2017/0317246 | A1* | 11/2017 | Kang | C08G 75/045 |
| 2018/0364408 | A1* | 12/2018 | Hwang | G02F 1/133524 |
| 2019/0064422 | A1* | 2/2019 | Kim | G02B 6/0053 |
| 2019/0129092 | A1* | 5/2019 | Zhang | G02B 6/0088 |
| 2019/0204497 | A1* | 7/2019 | Jeon | G02B 6/0035 |
| 2019/0293839 | A1* | 9/2019 | Lee | G02B 1/14 |

FOREIGN PATENT DOCUMENTS

| | | |
|---|---|---|
| KR | 10-1713148 | 3/2017 |
| KR | 10-2017-0057927 | 5/2017 |
| KR | 10-2017-0096246 | 8/2017 |
| KR | 10-1765185 | 8/2017 |
| KR | 10-1765919 | 8/2017 |
| KR | 10-1774568 | 9/2017 |

* cited by examiner

DISPLAY DEVICE AND METHOD OF MANUFACTURING THE SAME

CROSS-REFERENCE TO RELATED APPLICATION

This application claims priority from and the benefit of Korean Patent Application No. 10-2018-0000612, filed on Jan. 3, 2018, which is hereby incorporated by reference for all purposes as if fully set forth herein.

BACKGROUND

Field

Exemplary embodiments of the invention relate generally to a display device and a method of manufacturing the same, and more specifically to a display device and a method of manufacturing the same, which are capable of minimizing a bezel area and implementing excellent color reproducibility and excellent luminance.

Discussion of the Background

Generally, a liquid crystal display device includes: a display panel including a plurality of pixels configured to generate an image; and a backlight unit configured to supply light to the display panel. The pixels of the display panel display an image through the control of the transmittance of the light provided by the backlight unit.

Recently, in order to increase the efficiency of the light provided to display panels, light conversion members including quantum dots have been used. Generally, quantum dots each include a core particle and a protective shell configured to surround the core particle. Such a light conversion member can convert light having a predetermined color, generated by a light source, into white light. For example, the light conversion member can convert blue light, generated by a light source, into white light.

The white light generated by the light conversion member is provided to a display panel, and the pixels of the display panel may display an image by using the light provided by the light conversion member.

Meanwhile, recently, display devices having thinner and more aesthetic appearances have been commercialized in response to market demands. Furthermore, recently, organic light emitting displays thinner than liquid crystal display devices have been commercialized. Therefore, a further reduction in the thickness of a liquid crystal display device is required.

Conventionally, there is implemented a liquid crystal display device supporting a display panel and a backlight unit by means of a mold frame and including light sources by means of a bottom cover. In this case, the display panel is fastened to the mold frame by attaching the support portion of the mold frame and the lower substrate of the display panel by means of a bonding agent, such as double-sided tape, sealant, or glass frit.

Meanwhile, the double-sided tape is easily delaminated or naturally separated due to its low adhesive power, and is twisted in a hot and humid environment. Furthermore, the double-sided tape includes polymer resin. The double-sided tape has a water vapor transmission rate (WVTR) ranging from about 90 to 100 g/m2/day and, thus, cannot prevent moisture from penetrating from the outside. Accordingly, the double-sided tape cannot effectively serve as a bonding agent having barrier characteristics.

Furthermore, the sealant or glass frit is a liquid material or particles having predetermined viscosity. Accordingly, when the light guide plate and the display panel are attached to each other by means of the sealant or glass frit, it is difficult to control the width and height of the sealant or glass frit introduced by a dispenser.

Furthermore, the glass frit includes frit powder particles and filler particles. A metal oxide binder is mixed with them to increase bonding force, and then drying and calcination are performed, thereby forming glass frit. However, the glass frit is a material in which a metal oxide binder is mixed and has a viscous liquid or particle shape. Accordingly, it is difficult to manufacture glass frit in a rigid shape.

Furthermore, when the glass frit is melted by heat, an adjacent optical sheet may be deformed, or a wavelength conversion layer may be damaged.

The above information disclosed in this Background section is only for understanding of the background of the inventive concepts, and, therefore, it may contain information that does not constitute prior art.

SUMMARY

The present disclosure is directed to a display device which is capable of implementing a narrow bezel through the attachment of a display panel and a glass light guide plate by melting a spacer having a uniform width along a thickness direction by means of laser beams and is also capable of providing excellent design compatibility.

The present disclosure is directed to a display device having excellent reliability and durability, in which a light guide plate and a display panel are integrated with each other by means of a spacer having a low water vapor transmission rate (WVTR), thereby minimizing the influence of moisture and/or oxygen.

Additional features of the inventive concepts will be set forth in the description which follows, and in part will be apparent from the description, or may be learned by practice of the inventive concepts.

According to one exemplary embodiment of the invention, a display device includes: a display panel including a first substrate, a second substrate disposed opposite to the first substrate, and a liquid crystal layer disposed between the first substrate and the second substrate; a light guide plate configured to receive light from light sources disposed on a side surface thereof, and to emit the light to the display panel; an optical sheet disposed between the light guide plate and the first substrate; and a spacer disposed and attached between the display panel and the light guide plate; wherein the spacer has a uniform width along a thickness direction.

The spacer may have a width ranging from 1 mm to 3 mm.

At least one of side surfaces of the spacer may be disposed on the same plane as the side surfaces of the display panel and the light guide plate.

The spacer may have a thickness ranging from 0.1 mm to 1 mm.

The display device may further include a light blocking layer disposed between the spacer and the light guide plate.

The spacer may include a glass material.

Each of the second substrate and the light guide plate may include a glass material.

The display device may further include a light conversion member disposed between the light guide plate and the optical sheet.

The light conversion member may include a low-refractive layer, an inorganic film, a quantum dot layer, and an organic film.

The spacer may include a glass material excluding at least one of lead oxide PbO, silicon oxide SiO2, and tellurium oxide TeO2.

The spacer may have a water vapor transmission rate (WVTR) ranging from 10-6 g/m2/day to 10-3 g/m2/day.

The spacer may be spaced apart from at least one side of the optical sheet.

The display device may further include: a first polarization layer disposed between the first substrate and the optical sheet; and a second polarization layer disposed on the second substrate.

The optical sheet may include a combination of a prism sheet and a dual bright enhanced film (DBEF).

Reflective patterns may be formed on the bottom surface of the light guide plate, and the reflective patterns may each have a density increasing in proportion to the distance from the light sources.

According to another exemplary embodiment, a method of manufacturing a liquid crystal display device includes: applying a light conversion member onto a light guide plate; disposing a spacer along the edges of the light guide plate; melting and attaching the attachment surface of the spacer, to be attached onto the light guide plate, through the radiation of laser beams; disposing a display panel on the spacer; and melting and attaching the attachment surface of the spacer, to be attached onto the display panel, through the radiation of laser beams.

The spacer may be formed by attaching the opposite side surfaces of a plurality of glass rods at corners through laser beam radiation after the plurality of glass rods have been disposed in the non-display area of the display panel.

The method may further include: eliminating parts of the edges of the light conversion member; disposing an optical sheet on the light conversion member; disposing a first polarization layer on the optical sheet; and disposing a light blocking layer between the spacer and the light guide plate.

Disposing the spacer along the edges of the light guide plate may include aligning at least one of the side surfaces of the spacer on the same plane as the side surfaces of the display panel and the light guide plate.

Each of the laser beams may have a beam width of 100 μm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
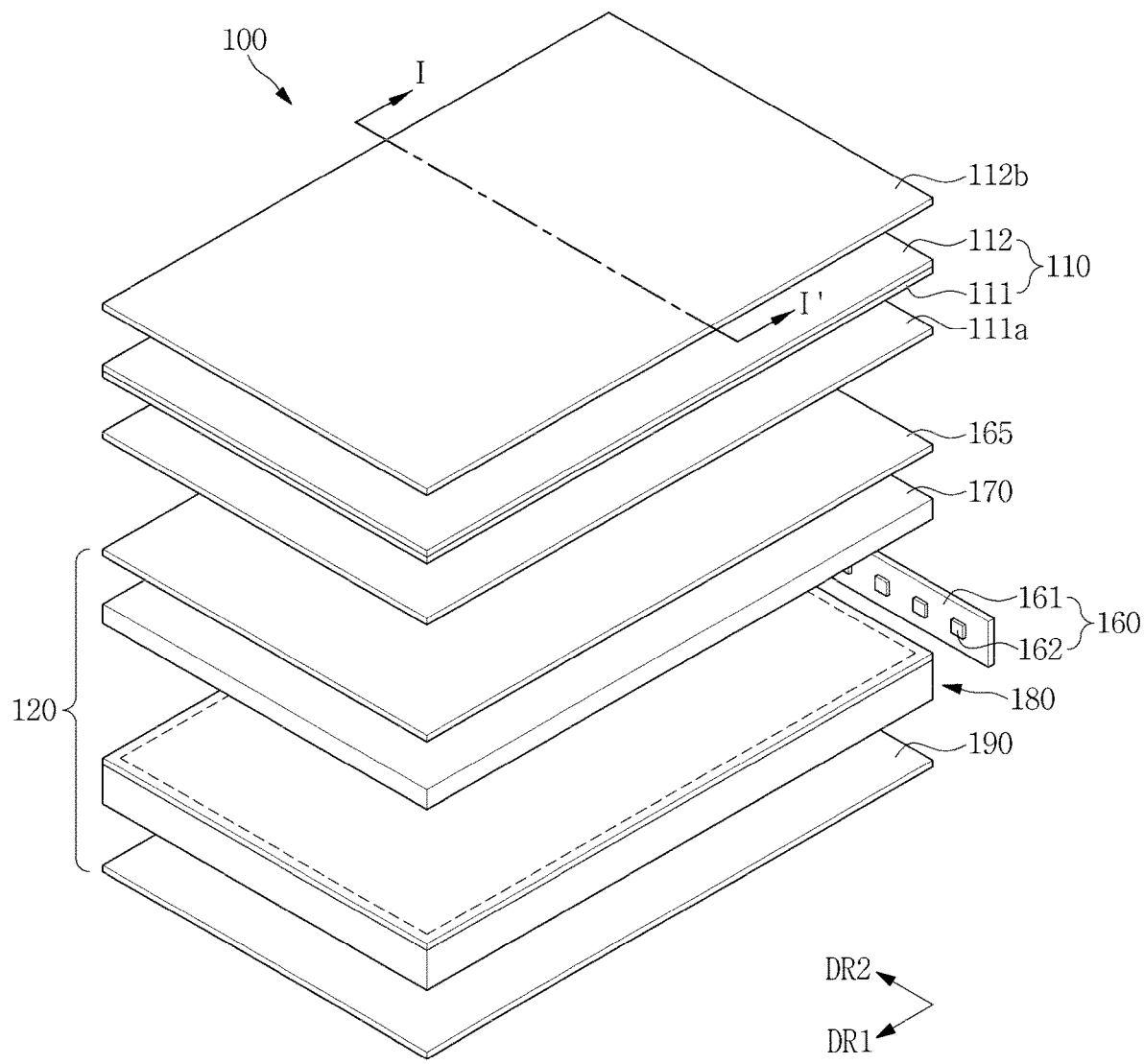
FIG. 1 is an exploded perspective view of a display device according to an exemplary embodiment of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein. The term "layer" or "sheet" used herein encompasses a sheet form, a film form, and a plate form unless specifically described otherwise. Furthermore, in the present disclosure, the attachment of "layers" or "sheets" may be performed by means of a bonding agent, an air gap, or a bead.

In order to clearly describe the present disclosure, portions unrelated to the description will be omitted, and the same reference symbols will be assigned to the same or similar components throughout the specification.

Figure 2:
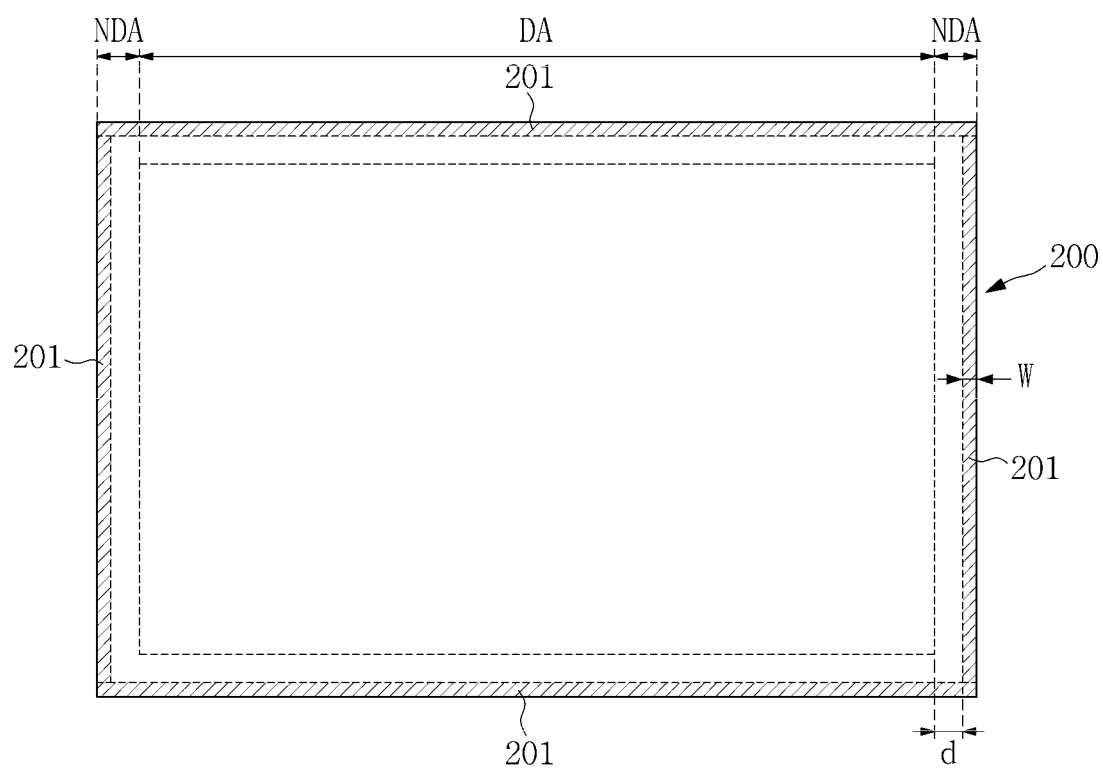
FIG. 2 is a plan view of the display device according to the exemplary embodiment.
Figure 3:
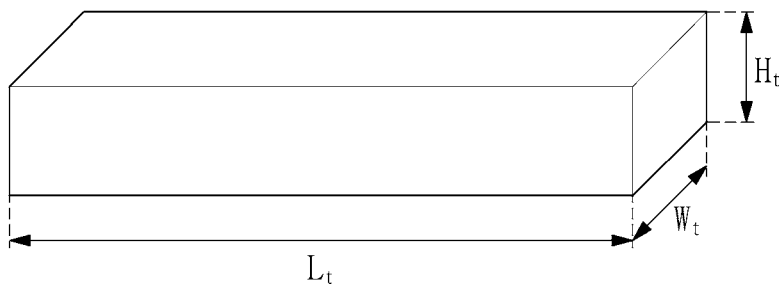
FIG. 3 is a perspective view showing one of the plurality of glass rods shown in FIG. 2.
Figure 4:
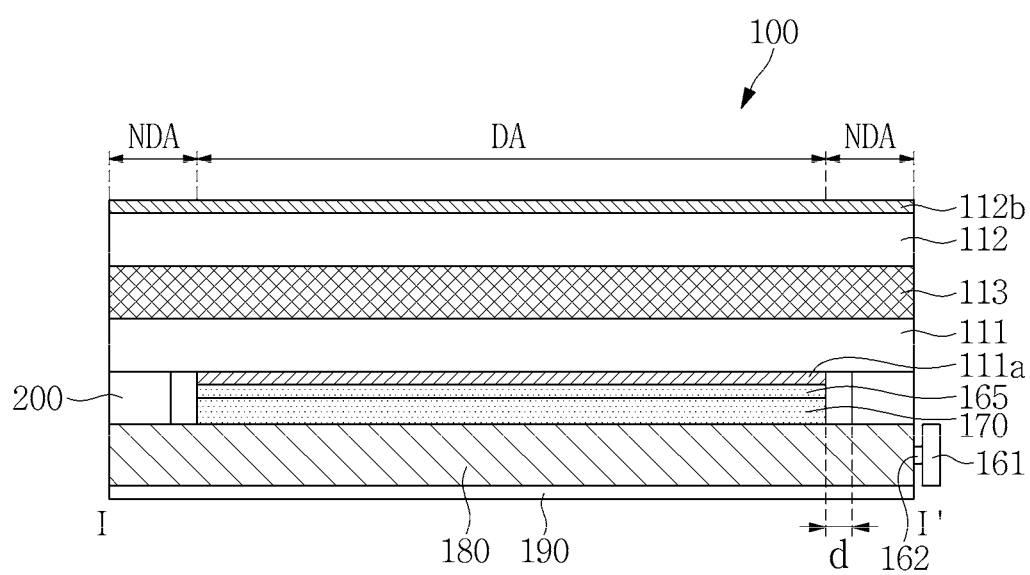
FIG. 4 is a cross-sectional view taken along line I-I' of FIG. 1.

FIG. 1 is an exploded perspective view of a display device according to an exemplary embodiment of the present disclosure, FIG. 2 is a plan view of the display device according to the exemplary embodiment of the present disclosure, FIG. 3 is a perspective view showing one of the plurality of glass rods shown in FIG. 2, and FIG. 4 is a cross-sectional view taken along line I-I' of FIG. 1.

Referring to FIGS. 1 to 4, a display device 100 according to an exemplary embodiment of the present disclosure may include a display panel 110, a backlight unit 120, and a spacer 200 disposed between the display panel 110 and the light guide plate 180 of the backlight unit 120.

The individual components of the display device 100 will be described in greater detail below.

First, the display panel 110 is responsible for the core function of displaying an image, and includes a first substrate 111 and a second substrate 112 attached to each other face-to-face with a liquid crystal layer 113 disposed therebetween. In this case, each of the first substrate 111 and the second substrate 112 includes a glass material.

The display panel 110 may be provided in the form of a square plate configured to receive an electrical signal from the outside and to display an image. In this exemplary embodiment, the display panel 110 may have a rectangle shape with a pair of longer sides and a pair of shorter sides. The display panel 110 includes a display area DA configured to display an image, and a non-display area NDA disposed around the display area DA.

The first substrate 111 is disposed below a liquid crystal layer 113. The first substrate 111 includes a plurality of pixel electrodes arranged in a matrix form, thin film transistors configured to apply drive voltages to the pixel electrodes, and various types of signal lines configured to drive the pixel electrodes and the thin film transistors. In other words, the first substrate 111 may be implemented as, for example, a thin film transistor (TFT) substrate.

The second substrate 112 is a color filter substrate which is disposed above the liquid crystal layer 113 to be on the opposite side of the first substrate 111. The second substrate 112 includes red, green and blue color filters corresponding to the pixels, and gate and data lines disposed around the color filters. The second substrate 112 also include a transparent common electrode which covers the above components.

The liquid crystal layer 113 is disposed between the first substrate 111 and the second substrate 112, and is rearranged by an electric field formed between the pixel electrodes and the common electrode. As described above, the rearranged liquid crystal layer 113 controls the transmittance of the light emitted from the backlight unit 120. An image is displayed to the outside in such a manner that the controlled light passes through the color filters.

Furthermore, a first polarization layer 111a is disposed below the first substrate 111, and a second polarization layer 112b is disposed above the second substrate 112. The first polarization layer 111a only allow specific polarized light of the light output from the backlight unit 120 to pass through, and absorbs or blocks residual light. The second polarization layer 112b only allow specific polarized light of the light having arrived from the outside to pass through, and absorbs or blocks residual light.

In particular, the first polarization layer 111a is disposed between the first substrate 111 and the backlight unit 120. The first polarization layer 111a may allow the edge portion of the bottom surface of the first substrate 111 to be exposed to the outside. In other words, the first polarization layer 111a is disposed in the center portion of the bottom surface of the first substrate 111. The first polarization layer 111a only allow specific polarized light of the light output from the backlight unit 120 to pass through, and absorbs or blocks residual light. The first substrate 111 is disposed on the top surface of the first polarization layer 111a, and changes the transmittance of the light output from the backlight unit 120.

Furthermore, in the liquid crystal display device 100, the backlight unit 120 is configured to supply light to the display panel 110 so that differences in transparency exhibited by the display panel 110 can be manifested to the outside, and the backlight unit 120 is disposed below the display panel 110.

The backlight unit 120 may be an edge-lit backlight unit. As shown in FIG. 1, the backlight unit 120 includes a light source unit 160, an optical sheet 165, a light conversion member 170, a light guide plate 180, a reflective sheet 190, and a spacer 200. The optical sheet 165, the light conversion member 170, the light guide plate 180, and the reflective sheet 190 have longer sides in a first direction DR1, and have shorter sides in second direction DR2 intersecting the first direction DR1.

The light source unit 160 may include a circuit substrate 161, and a plurality of light sources 162 disposed on the circuit substrate 161. The light source unit 160 is disposed adjacent to one side of the light guide plate 180 in the second direction DR2. The light sources 162 are arranged along the second direction DR2. The light sources 162 may generate light having a predetermined color, and may radiate the generated light to the light guide plate 180. For example, the light sources 162 may be blue LEDs configured to generate blue light. In this case, the first and second directions are directions which define the plane of the liquid crystal display device 100.

The circuit substrate 161 may be disposed on the light-incident surface of the light guide plate 180. The circuit substrate 161 may be connected to a power supply (not shown), and may transfer electrical energy to the light sources 162. The shape of the surface of the circuit substrate 161 opposite to the light-incident surface of the light guide plate 180 may correspond to the shape of the light-incident surface of the light guide plate 180. The surface of the circuit substrate 161 may be parallel to the light-incident surface of the light guide plate 180. Furthermore, the area of the surface of the circuit substrate 161 may be substantially the same as the area of the light-incident surface of the light guide plate 180.

The light guide plate 180 may include a glass material, and may have a parallelepiped plate shape. The light guide plate 180 may be located beside the light source unit 160. In other words, the light guide plate 180 may be located substantially on the same plane as the light source unit 160.

The light guide plate 180 disperses the light, emitted from the light source unit 160, into the display panel 110. In other words, the light emitted from the light sources 162 is converted into surface light by the light guide plate 180, and is radiated onto the display panel 110.

Furthermore, the light guide plate 180 may guide the light, radiated from the light source unit 160, to the light conversion member 170. The light conversion member 170 may convert blue light, emitted and incident from the light guide plate 180, into white light. The light guide plate 180 and the light conversion member 170 are not limited thereto.

The light conversion member 170 is disposed between the light guide plate 180 and the optical sheet 165, and includes a low-refractive layer, an inorganic film, quantum dots, and an organic film. More specifically, as an example, the light conversion member 170 includes the low-refractive layer applied onto the top surface of the light guide plate 180, and the inorganic film, the quantum dots, and the organic film sequentially applied onto the low-refractive layer. In this case, although each of the inorganic and organic films of the light conversion member 170 may include a single layer, the number of layers included in the inorganic and organic films are not limited thereto.

Furthermore, the quantum dots of the light conversion member 170 are semiconductor particles having nanometer-level diameters, and have photoluminescence characteristics. Each of the quantum dots has a unique band gap. As an electron in an excited state transitions to a stable state, the electron emits light in a wavelength range corresponding to the band gap. The quantum dot has the property in which the band gap thereof is inversely proportional to the size thereof. Accordingly, the quantum dot may generate light in a desired wavelength range through the control of the size thereof. Accordingly, the light conversion member 170 may convert the light, emitted and incident from the light guide plate 180, into light having a longer wavelength. A more detailed description of the light conversion member 170 will be given with reference to FIG. 5.

The optical sheet 165 is disposed on the light conversion member 170. The optical sheet 165 may include a prism sheet, and a dual bright enhanced film (DBEF). The optical sheet 165 according to an exemplary embodiment of the present disclosure is a composite optical sheet formed by attaching at least one bright enhanced film and at least one prism sheet to each other, and may be disposed between the display panel 110 and the light guide plate 180. More specifically, the optical sheet 165 is disposed between the first polarization layer 111a, disposed below the first substrate 111, and the light guide plate 180, and controls the path of the light guided from the light guide plate 180. In this case, the optical sheet 165 diffuses light from the light guide plate 180 so that the light is incident on the light-incident surface of the display panel 110 at a substantially vertical angle. In other words, the optical sheet 165 improves the efficiency of the concentration of light onto the display panel 110. Through this, a luminance increase effect is achieved.

The spacer 200 according to an exemplary embodiment of the present disclosure is disposed between the display panel 110 and the light guide plate 180. At least one side surface of the spacer 200 is disposed on the same plane as the side surfaces of the display panel 110 and the light guide plate 180. The spacer 200 may have a width ranging from 1 to 3 mm, and may have a thickness ranging from 0.1 to 1 mm. The spacer 200 has a uniform width $W_t$ along a thickness direction $H_t$. The display device may further include a light blocking layer disposed between the spacer and the light guide plate.

Glass frit which is generally used as a bonding agent or sealant is a viscous liquid material manufactured by mixing glass paste with a metal-oxide binder. The glass frit includes at least lead oxide PbO, silicon oxide SiO2, and tellurium oxide TeO2.

Accordingly, when the glass frit is applied onto the light guide plate, the glass frit can be applied up to a maximum height of 20 μm due to its liquid physical property, and can be distributed in various widths. Accordingly, when the display panel 110 and the light guide plate 180 are attached to each other, it is difficult to seal the glass frit in a designed width and height.

Furthermore, double-sided tape which is generally used as a bonding agent or sealant includes a polymer resin material. The double-sided tape has a water vapor transmission rate (WVTR) ranging from about 90 to 100 g/m2/day and, thus, cannot prevent moisture or humidity from penetrating from the outside.

In contrast, the spacer 200 according to an exemplary embodiment of the present disclosure includes a glass material excluding at least one of lead oxide PbO, silicon oxide SiO2, and tellurium oxide TeO2, which are binders used in glass frit. Accordingly, the spacer 200 is not easily deformed even when laser beams are radiated thereonto.

Furthermore, the spacer 200 has a WVTR ranging from 10-6 to 10-3 g/m2/day which is lower than the WVTR of the polymer resin ranging from 90 to 100 g/m2/day. In other words, the spacer 200 has resistance to the penetration of moisture or humidity.

As shown in FIG. 2, the spacer 200 is disposed along the outsides of the non-display area NDA corresponding to the longer and shorter sides of the light guide plate 180 in the shape of a closed curve. In this case, the spacer 200 may be disposed along the outsides of the non-display area NDA spaced apart from the display area DA by a predetermined distance d and corresponding to the longer and shorter sides of the display panel 110 to surround the longer and shorter sides of the display panel 110 in different lengths.

Meanwhile, the spacer 200 may be formed by attaching the opposite side surfaces of a plurality of glass rods 201 at corners through laser beam radiation after the plurality of glass rods 201 has been disposed in the non-display area NDA.

FIG. 3 is a perspective view showing one of the plurality of glass rods 201 shown in FIG. 2. As shown in FIG. 3, the glass rod 201 according to an exemplary embodiment of the present disclosure has a parallelepiped shape having a predetermined length $L_t$, a predetermined width $W_t$, and a predetermined thickness $H_t$. The plurality of glass rods 201 has lengths $L_t$ of a few tens of a cm in accordance with the lengths of the longer and shorter sides of the display panel 110.

The spacer 200 may be formed in an integrated manner by attaching the opposite side surfaces of the plurality of glass rods 201 at their corners through laser beam radiation after the plurality of glass rods 201 has been disposed in the non-display area NDA.

Furthermore, when the non-display area NDA of the display panel 110 has a width of 4 mm, the spacer 200 may have a maximum width $W_t$ of 3 mm, and may also have a thickness $H_t$ ranging from a minimum of 0.1 mm to a maximum of 1 mm. However, the width $W_t$ of the spacer 200 is not limited thereto, but may be set in accordance with the width of the non-display area NDA. Furthermore, the height $H_t$ of the spacer 200 may be set to a value equal to the sum of the thickness of the first polarization layer 111a, the thickness of the light conversion member 170, and the thickness of the optical sheet 165.

Furthermore, as shown in FIG. 4, the spacer 200 may be disposed to correspond to the edges of the non-display area NDA of the display panel 110 in a direction perpendicular to the direction in which the light of the light sources 162 is emitted. More specifically, the spacer 200 is spaced apart from the first polarization layer 111a, the optical sheet 165, and the light conversion member 170 by a distance d in the direction of the non-display area NDA of the display panel 110. The spacer 200 is disposed between the first substrate 111 and the light guide plate 180. In this case, the spacer 200 comes into contact with the bottom surface of the first substrate 111 and the top surface of the light guide plate 180. The spacer 200 is attached to part or all of an attachment surface between the bottom surface of the first substrate 111 and the top surface of the light guide plate 180 by means of laser beams on a 100 μm (0.1 mm) beam width basis. In this case, the width of the spacer 200 is rarely varied by the radiation of laser beams.

In other words, part or all of the overall width W of the spacer 200 is attached to the light guide plate or spacer. Furthermore, the spacer 200 is spaced from the optical sheet 165 and the light conversion member 170 by a distance d. More specifically, the spacer 200 is disposed along the edges of an area where an image is not displayed, i.e., a dead space. Accordingly, when laser beams are radiated onto an attachment surface between the spacer 200 and the first substrate 111 and an attachment surface between the spacer 200 and the light guide plate 180 on a 100 μm beam width basis so that the first substrate 111 and the light guide plate 180 are attached by the spacer 200, the optical sheet 165 and the light conversion member 170 are not deformed by laser beams because the optical sheet 165 and the light conversion member 170 are spaced apart from the spacer 200 by a distance d.

As a result, according to the exemplary embodiment of the present disclosure, a mold frame and a bottom cover can be omitted, and the interval between the light guide plate 180 and the second substrate 112, i.e., the lower substrate of the display panel 110, can be minimized.

The reflective sheet 190 is disposed below the light guide plate 180, and performs the function of improving the efficiency of light by reflecting the light, emitted from the bottom surface of the light guide plate 180, back to the light guide plate 180. The reflective sheet 190 may include, for example, a material including a metal, such as Ag.

Additionally, in order to increase the light dispersion effect of the light guide plate 180, reflective patterns configured to reflect light such that guided light is emitted upward may be formed on the bottom surface of the light guide plate 180. It should be noted that the reflective patterns are omitted in FIG. 4 for ease of description. In this case, although the reflective patterns may be formed in the shape of convex lenses, they are not limited thereto.

The reflective patterns include patterns which are spaced apart from the light-incident surface of the light guide plate 180 in the direction of a light-facing surface opposite to light-incident surface and which are disposed substantially parallel.

Furthermore, according to one exemplary embodiment, the reflective patterns are disposed to each have a density increasing in proportion to the distance from the light-incident surface of the light guide plate 180 in the direction of the light-facing surface opposite to the light-incident surface, in order to improve light uniformity. The reason for this is that the light emitted from the light source unit 160 is attenuated in the direction from the light-incident surface to the light-facing surface and thus more light concentration rate is required in the direction. Accordingly, in order to supply uniform light to the display panel 110, the quantity of light reflected from the reflective pattern disposed closest to the light-incident surface needs to be made lower, and the quantity of light reflected from the reflective pattern disposed closest to the light-facing surface needs to be made higher.

Additionally, light blocking layers may be disposed on the lower surface of the spacer 200 in contact with the light guide plate 180 and the upper surface of the spacer 200 in contact with the first substrate 111, and may block leaking light.

Figure 5:
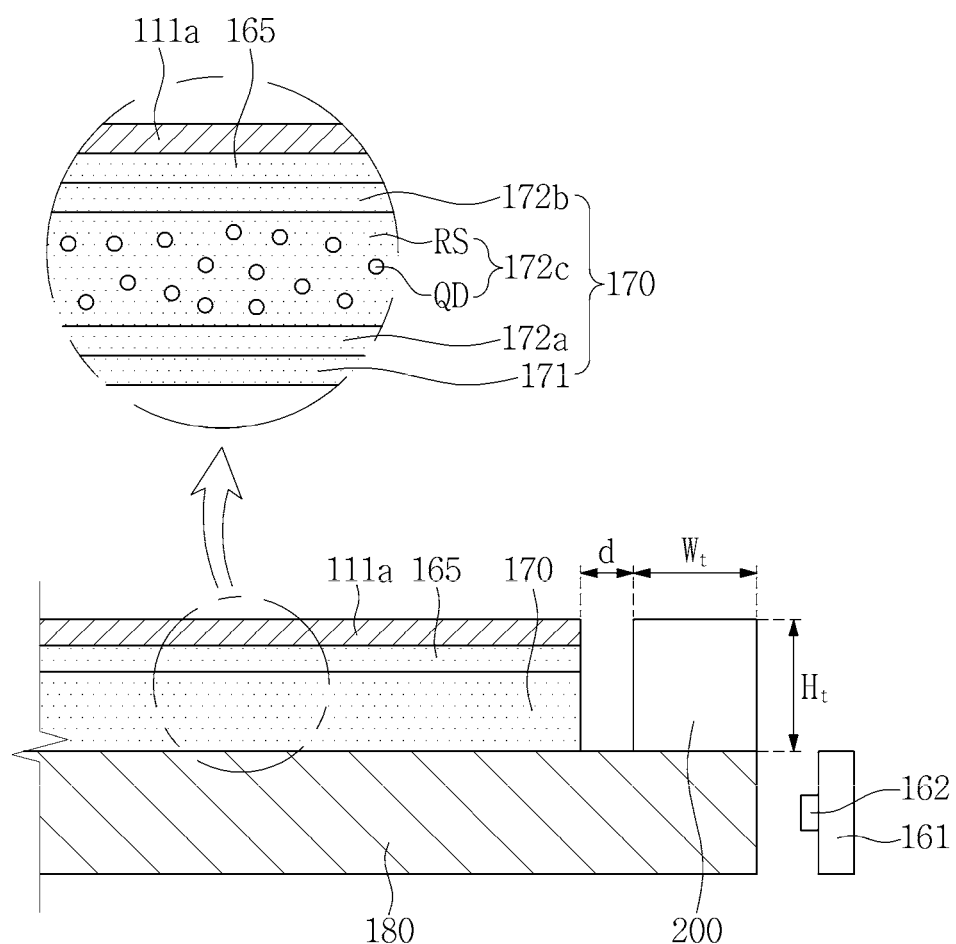
FIG. 5 is a view illustrating the configuration of a light conversion member according to an exemplary embodiment.

FIG. 5 is a view illustrating the configuration of a light conversion member according to an exemplary embodiment of the present disclosure.

The light conversion member 170 is spaced apart from the light-incident surface of the light guide plate 180 by the sum of the width $W_t$ of the spacer 200 and the distance d from the spacer 200. In this case, the light conversion member 170 may cover part of the top surface of the light guide plate 180. In this case, the sum of the distance d and the width $W_t$ is the same as the width of the non-display area NDA of the display panel 110.

The light conversion member 170 is disposed on the light guide plate 180, and includes a low-refractive layer 171, an inorganic film 172a, a quantum dot layer 172c, and an organic film 172b. Although each of the inorganic film 172a and the organic film 172b is illustrated as being a single layer in FIG. 5, it may include a plurality of inorganic or organic films.

The low-refractive layer 171 is disposed on the top surface of the light guide plate 180, and totally reflects part of the light, incident on the top surface of the light guide plate 180, to the reflective sheet 190 disposed below the light guide plate 180. Furthermore, the reflective sheet 190 causes the totally reflected light to be vertically emitted through the top surface of the light guide plate 180. As described above, the disposition of the low-refractive layer 171 on the top surface of the light guide plate 180 can maintain higher light concentration and higher luminance than the presence of only an air layer above the light guide plate 180, thereby further improving the efficiency of light supplied to the display panel.

The quantum dot layer 172c includes wavelength conversion material QD and resin RS. In this exemplary embodiment, the wavelength conversion material QD may be quantum dots. However, the wavelength conversion material QD is not limited thereto, but may be phosphors.

Quantum dots are semiconductor particles having nanometer-level diameters, and have photoluminescence characteristics. Each of the quantum dots has a unique band gap. As an electron in an excited state transitions to a stable state, the electron emits light in a wavelength range corresponding to the band gap. The quantum dot has the property in which the band gap thereof is inversely proportional to the size thereof. Accordingly, the quantum dot may generate light in a desired wavelength range through the control of the size thereof. The quantum dots may be uniformly distributed throughout the quantum dot layer 172c, and may provide uniform white light to the display panel side of the light guide plate 180.

Meanwhile, the quantum dot layer 172c is vulnerable to oxygen and moisture from the outside. Accordingly, there is required a barrier configured to protect the quantum dot layer 172c. In order to protect the quantum dot layer 172c, according to an exemplary embodiment of the present disclosure, the inorganic film 172a and the organic film 172b are disposed on the top and bottom surfaces of the quantum dot layer 172c, and the spacer 200 is disposed on both sides of the quantum dot layer 172c.

Meanwhile, the inorganic film 172a includes an inorganic material, such as silicon nitride SiNx. The inorganic film 172a is formed through chemical vapor deposition (CVD) or atomic layer deposition (ALD). However, an exemplary embodiment of the present disclosure is not limited thereto, but the inorganic film 172a may be formed using one of various methods well known to those skilled in the art.

The organic film 172b may include a polymer resin-based material. The organic film 172b may further include acrylic resin, epoxy resin, polyimide, and polyethylene, which are polymer materials. The organic film 172b may be formed through thermal deposition. The thermal deposition used to form the organic film 172b is performed within a temperature range which does not damage the quantum dot layer 172c. However, an exemplary embodiment of the present disclosure is not limited thereto, and the organic film 172b may be formed using one of various methods well known to those skilled in the art.

The inorganic film 172a mainly suppresses the penetration of moisture or oxygen. However, the WVTR of the inorganic film 172a including a single layer ranges from 1 to 10 g/m2/day, and an inorganic film including a plurality of layers does not completely suppress the penetration of moisture from the outside.

The inorganic film 172a including a single layer or a plurality of layers is not effective as a barrier for the light conversion member against moisture or oxygen. Furthermore, the organic film 172b includes polymer resin and, thus, is considerably vulnerable to moisture and oxygen.

Accordingly, the spacer 200 according to the exemplary embodiment of the present disclosure is disposed to surround the light conversion member 170, and thus minimizes damage to the light conversion member 170 attributable to moisture and/or oxygen from the outside, thereby improving the life span of the light conversion member 170.

Figure 6:
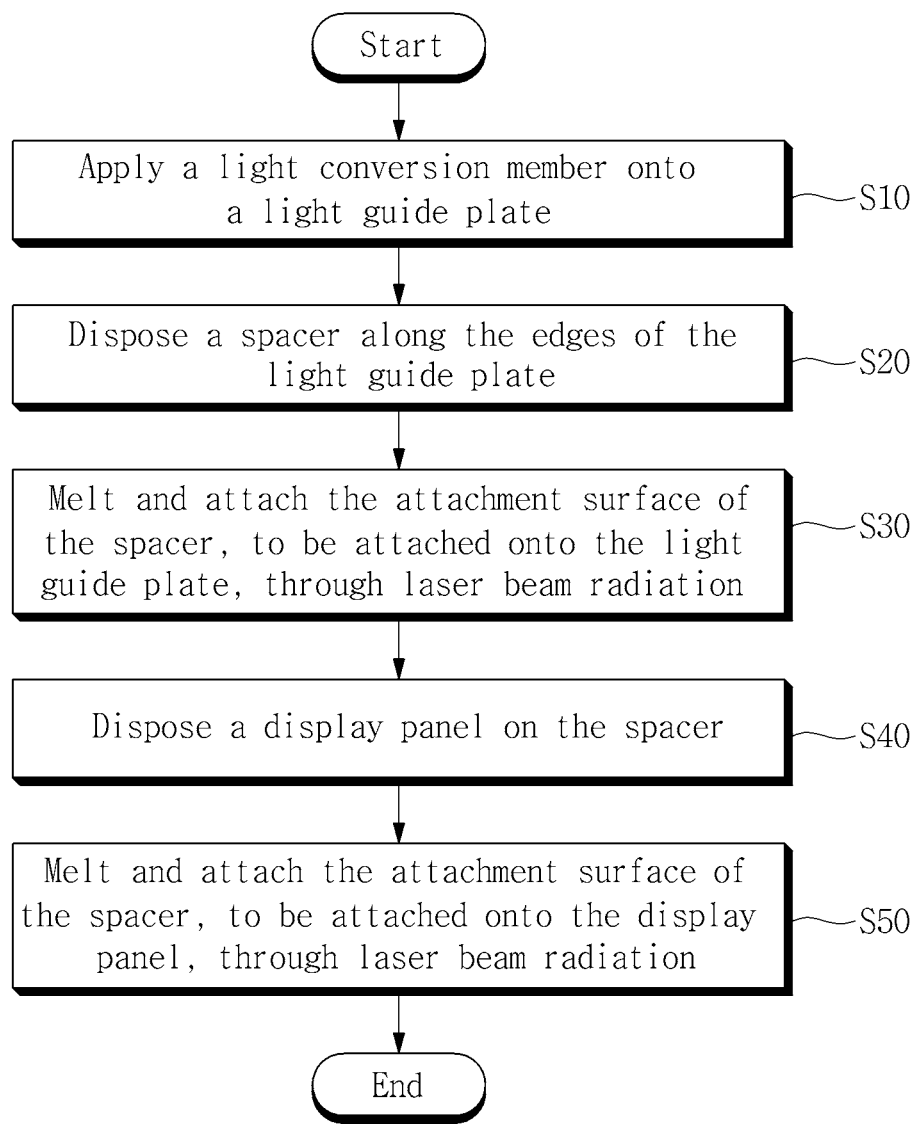
FIG. 6 is a flowchart of a method of manufacturing a liquid crystal display device according to an exemplary embodiment.

FIG. 6 is a flowchart of a method of manufacturing a liquid crystal display device according to an exemplary embodiment of the present disclosure, and FIGS. 7A, 7B, 7C, and 7D are views illustrating the method of manufacturing a liquid crystal display device shown in FIG. 6.

Referring to FIG. 6, a method of manufacturing a liquid crystal display device according to an exemplary embodiment of the present disclosure includes: step S10 of applying the light conversion member 170, including the low-refractive layer 171, the inorganic film 172a, the quantum dot layer 172c, and the organic film 172b, onto the light guide plate 180; step S20 of disposing the spacer 200 along the edges of the light guide plate 180; step S30 of melting and attaching the attachment surface of the spacer 200, to be attached onto the light guide plate 180, through laser beam radiation; step S40 of disposing the display panel 110 on the spacer 200; and step S50 of melting and attaching the attachment surface of the spacer 200, to be attached onto the display panel 110, through laser beam radiation. Detailed descriptions of the individual steps will be given with reference to FIGS. 7A, 7B, 7C, and 7D.

Figure 7A:
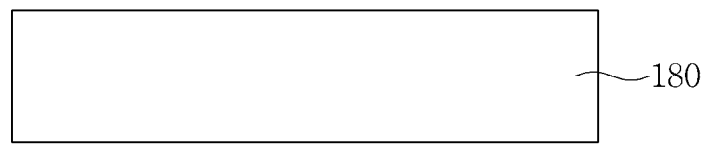
FIGS. 7A, 7B, 7C, and 7D are views illustrating the method of manufacturing a liquid crystal display device shown in FIG. 6.

First, referring to FIG. 7A, the light guide plate 180 is prepared.

Figure 7B:
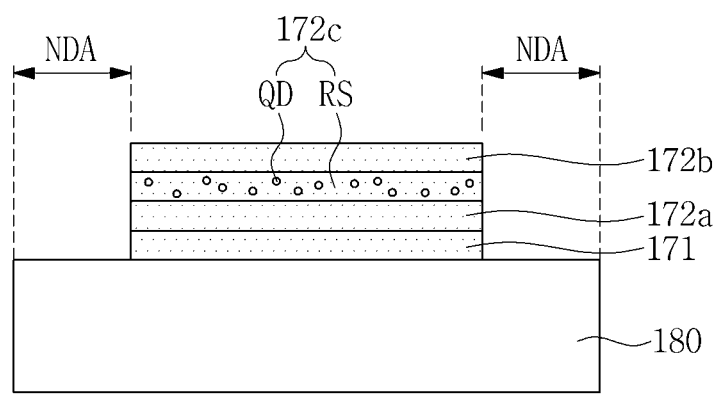

Referring to FIG. 7B, the low-refractive layer 171, the inorganic film 172a, the quantum dot layer 172c, and the organic film 172b constituting the light conversion member 170 are sequentially applied onto the light guide plate 180.

In this case, the quantum dot layer 172c is formed by ultraviolet-ray (UV) curing liquid resin RS including a wavelength conversion material QD.

Thereafter, parts of both side edges of the light conversion member 170 are eliminated. In this case, the parts of both side edges are areas which correspond to the non-display area NDA of the display panel 110 and in which the spacer 200 may be disposed.

Furthermore, after the optical sheet 165 has been disposed on the top surface of the light conversion member 170, the first polarization layer 111a is disposed. In this case, the width of the optical sheet 165 and the first polarization layer 111a is the same as the width of the light conversion member 170 from which the parts of both sides have been eliminated.

Figure 7C:
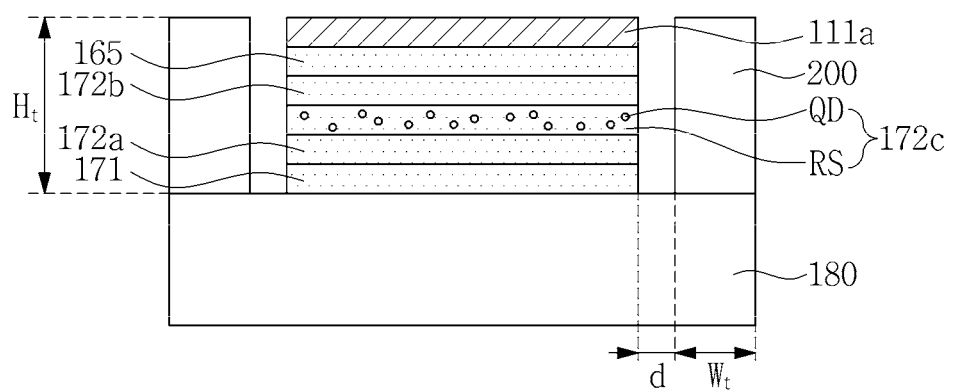

Referring to FIG. 7C, the spacer 200 is disposed along the edges of the light guide plate 180. In this case, at least one of the side surfaces of the spacer 200 is aligned on the same plane as the side surfaces of the display panel 110 and the light guide plate 180. In this case, the spacer 200 may be formed by attaching the opposite side surfaces of the plurality of glass rods (201 of FIG. 2) at corners through laser beam radiation after the plurality of glass rods 201 has been disposed in the non-display area NDA of the display panel 110.

Furthermore, the spacer 200 has a uniform width $W_t$ in a thickness direction $H_t$, and also has a height $H_t$ equal to the sum of the thickness of the first polarization layer 111a, the thickness of the light conversion member 170, and the thickness of the optical sheet 165.

Thereafter, laser beams are radiated onto the attachment surface of the spacer 200 in contact with the top surface of the light guide plate 180. In this case, laser beams are radiated onto part or all of the attachment surface on a 100 μm (0.1 mm) beam width basis. Accordingly, part or all of the attachment surface of the spacer 200 is melted and cured, and thus the spacer 200 is attached onto the top surface of the light guide plate 180.

Figure 7D:
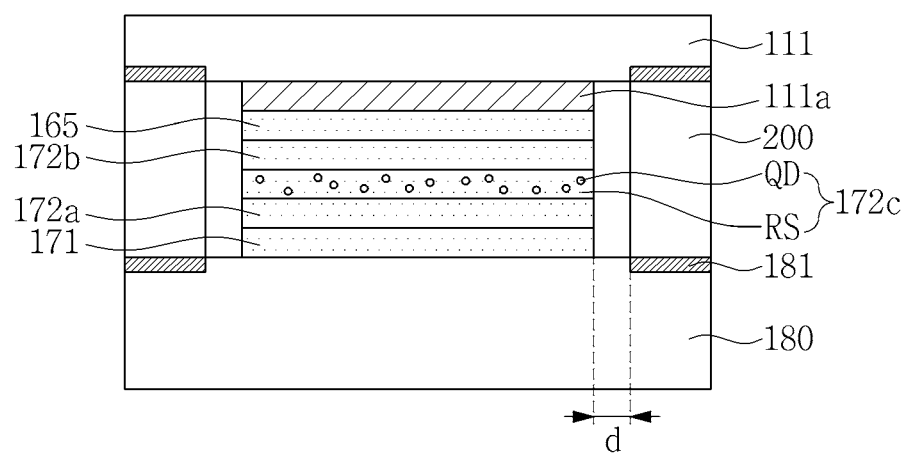

Referring to FIG. 7D, in the state in which the spacer 200 has been attached to the light guide plate 180, after the display panel 110 has been disposed on the spacer 200, laser beams are radiated onto part or all of the attachment surface of the spacer 200, to be attached onto the display panel 110, on a 100 μm (0.1 mm) beam width basis. Accordingly, part or all of the attachment surface of the spacer 200 is melted and cured, and thus the spacer 200 is attached onto the bottom surface of the display panel 110.

According to an exemplary embodiment of the present disclosure, the spacer 200 is attached by means of laser beams applied onto part or all of an attachment surface between the spacer 200 and the bottom surface of the display panel 110 and part or all of an attachment surface between the spacer 200 and the top surface of the light guide plate 180 on a 100 μm beam width basis.

In order to additionally increase the light dispersion effect of the light guide plate 180, a method of manufacturing a liquid crystal display device according to an exemplary embodiment of the present disclosure may further includes the steps of: forming reflective patterns on the bottom surface of the light guide plate 180; attaching the reflective sheet 190 configured to perform the function of improving the efficiency of light by reflecting the light, emitted from the bottom surface of the light guide plate 180, back to the light guide plate 180 below the light guide plate 180; and disposing light blocking layers on the lower surface of the spacer 200 in contact with the light guide plate 180 and the upper surface of the spacer 200 in contact with the first substrate 111.

The reflective patterns (not shown) are formed to each have a density which increases in proportion to the distance from the light-incident surface of the light guide plate 180. The light blocking layers are disposed to cover part of the top surface of the light guide plate 180 and part of the bottom surface of the display panel 110 in accordance with the spacer 200. Accordingly, the light blocking layers may prevent light from leaking through a space between the spacer 200 and the light guide plate 180.

In the liquid crystal display device according to an exemplary embodiment of the present disclosure, the display panel and the glass light guide plate are attached to each other by melting the spacer having a uniform width along a thickness direction by means of laser beams, thereby implementing a narrow bezel.

The display device and the method of manufacturing the same according to the exemplary embodiments have the following advantages:

According to the present disclosure, the display panel and the light guide plate can be attached to each other by melting and curing the spacer having a uniform width along a thickness direction by means of laser beams. As a result, a bezel area is minimized, and thus the display panel and the backlight unit can be implemented as a single body.

Furthermore, According to the present disclosure, the spacer can prevent moisture from penetrating into the light conversion member and the optical sheet disposed on the light guide plate, thereby improving the life spans of the light conversion member and the optical sheet.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
    a display panel comprising a first substrate, a second substrate disposed opposite to the first substrate, and a liquid crystal layer disposed between the first substrate and the second substrate, the display panel having a display area and a non-display area disposed around the display area;
    a light guide plate configured to receive light from light sources disposed on a side surface, and to emit the light to the display panel;
    an optical sheet disposed between the light guide plate and the first substrate; and
    a spacer disposed and attached between the display panel and the light guide plate;
    wherein the spacer comprises a glass material, has a uniform width along a thickness direction, is disposed along an outside of the non-display area, is spaced apart from the display area in a plan view by a uniform predetermined distance, and has a closed shape to surround the display area in the plan view.

2. The display device of claim 1, wherein the spacer has a width ranging from 1 mm to 3 mm.

3. The display device of claim 1, wherein at least one of side surfaces of the spacer is disposed on a same plane as side surfaces of the display panel and the light guide plate.

4. The display device of claim 1, wherein the spacer has a thickness ranging from 0.1 mm to 1 mm.

5. The display device of claim 1, further comprising a light blocking layer disposed between the spacer and the light guide plate.

6. The display device of claim 1, wherein each of the second substrate and the light guide plate comprises a glass material.

7. The display device of claim 1, further comprising a light conversion member disposed between the light guide plate and the optical sheet.

8. The display device of claim 7, wherein the light conversion member comprises a low-refractive layer, an inorganic film, a quantum dot layer, and an organic film.

9. The display device of claim 1, wherein the spacer comprises a glass material excluding at least one of lead oxide PbO, silicon oxide SiO2, and tellurium oxide TeO2.

10. The display device of claim 1, wherein the spacer has a water vapor transmission rate (VWTR) ranging from 10-6 g/m2/day to 10-3 g/m2/day.

11. The display device of claim 1, wherein the spacer is spaced apart from at least one side of the optical sheet.

12. The display device of claim 1, further comprising:
   a first polarization layer disposed between the first substrate and the optical sheet; and
   a second polarization layer disposed on the second substrate.

13. The display device of claim 1, wherein the optical sheet comprises a combination of a prism sheet and a dual bright enhanced film (DBEF).

14. The display device of claim 1, wherein reflective patterns are formed on a bottom surface of the light guide plate, and each of the reflective patterns has a density increasing in proportion to a distance from the light sources.

* * * * *